3,326,990
CYCLOOLEFIN PRODUCTION USING ZIEGLER-TYPE REDUCING AGENT AND A NICKEL CHELATE
Reginald F. Clark, Lake Charles, La., assignor, by mesne assignments, to Columbian Carbon Company, a corporation of Delaware
No Drawing. Filed June 14, 1962, Ser. No. 202,406
9 Claims. (Cl. 260—666)

This application is a continuation-in-part of application Ser. No. 123,992, filed July 14, 1961, now abandoned.

This invention is concerned with an improved process for the production of cycloolefins by the cycle polymerization of a conjugated diolefin in the presence of a catalyst system comprising a Ziegler-type reducing agent and a nickel chelate compound.

The cyclic polymerization reaction to which the process of the present invention is applicable is the cyclic dimerization, trimerization or tetramerization of a conjugated diolefin, such as 1,3-butadine or a substituted butadiene, to yield as the predominant product a cycloolefin or a mixture of cyloolefins having from six to about twenty cyclic carbon atoms, including products such as vinylcyclohexene and cylododecatriene.

The catalyst system used to effect the cyclic polymerization of the instant invention comprises a Ziegler-type reducing agent, such as triethylaluminum, and a nickel chelate compound, such as nickel dimethylglyoxime. The catalyst systems of the instant invention comprise not only the two separate ingredients but also the interaction product, if any, of the two.

Numerous processes have been devised in the past to effect the cyclic polymerization of various conjugated diolefin. These prior art processes include an essentially thermal process, as well as the use of a variety of different catalysts. These catalysts used in the prior art include, in many instances, nickel tetracarbonyl or a substituted nickel carbonyl, whereby all or a part of the carbonyl groups have been replaced by organic compounds or oxy-organic compounds of phosphorous. Other catalysts which have been devised, especially for the preparation of cyclododecatriene, include various compounds of titanium and chromium used in conjunction with various Ziegler-type reducing agents, such as organoaluminum halides or organoaluminum hydrides. Operable temperature ranges of these processes vary from about −20° C. up to about 600° C. Many of the prior art catalysts and/or catalyst systems are difficult to prepare, others utilize toxic materials, while others employ materials of considerable expense. The catalyst system of the instant invention is simple and economical to prepare and the cyclic polymerization is carried out at a convenient temperature range. Other advantages of the subject process will be apparent to those skilled in the art.

The general type of catalyst system employed in the instant process is known in the prior art. However, the use of such a catalyst system has been directed to the linear polymerization of a variety of monomers, principally α-monoolefins, such as ethylene, although the use of 1,3,-butadiene in conjunction with such a catalyst system has been mentioned. Depending upon the precise reaction conditions employed linear polymers in the range of dimers up to high molecular weight crystalline polymers have been obtained, by this prior art process.

It has now been found that an aliphatic conjugated diolefin, such as 1,3-butadiene, may be cyclically polymerized in the presence of a catalyst system comprising a Ziegler-type reducing agent and a nickel chelate compound, and the cyclic compounds recovered. Thus, according to the herein described process, a conjugated diolefin yields a product that predominates in a cycleolefin product. For example, with 1,3-butadiene, a product consisting essentially of 1-vinyl-4-cyclohexene, 1,5-cyclooctadiene, and 1,5,9-cyclododecatriene is formed, with smaller amounts of other cycloolefins, such as cyclohexadecatetraone. By proper selection of the reaction conditions the predominant cycloolefin compound formed may be controlled. Thus, for example, with 1,3-butadiene a cycloolefin product containing essentially 1,5,9-cyclododecatriene is obtained under proper conditions.

In effecting the cyclic polymerization process of the present invention, the catalyst system desirably has a molar ratio of Ziegler-type reducing agent to nickel chelate of from about 5:1 to about 35:1 with lower ratios such as 3:1 being useful as shown by the examples, generally with the preferred range being between about 15:1 and 25:1. The preferred reaction temperature range is from about 80° C. to 200° C., more preferably 100° C. to 180° C. Of course, other temperatures, such as 70° C., are useful, as is shown by the examples set forth herein. Desirably, the reaction time is from about 0.5 hour to about 36 hours, or more, preferably about 1 to about 20 hours, depending upon the precise reaction conditions employed, including temperature. Pressures may be from about 50–1000 p.s.i.g. or more, 100–600 p.s.i.g. being preferred, depending primarily upon temperature.

The concentration of the catalyst system used in the cyclic polymerization process is suitably 0.1% to 10% or more by weight of the aliphatic conjugated diolefin monomer. The preferred percentage of catalyst system is between 0.1% and 4% by weight. This proportion is determined using the weight of the reactants or components of the catalyst system, that is, the combined weight of the Ziegler-type reducing agent and nickel chelate.

In the catalyst system of the present invention various Ziegler-type reducing agents and nickel chelate compounds are useful. More specifically, the Ziegler-type reducing agent component of the catalyst system comprises a non-transition metal compound, wherein the compound is a member selected from the group consisting of organometallics, complex organometallics, organometallic halides, metal hydrides, complex metal hydrides and complex organometallic hydrides, preferably consisting of or comprising an alkyl aluminum compound having at least two alkyl radicals. The preferred nickel chelate compound component of the catalyst system is a chelate of nickel wherein the chelating group is a member selected from the group consisting of glyoximes, β-ketones, α-aminocarboxylic acids, α-hydroxycarboxylic acids, and 8-quinolinols. Ketoximes, α-hydroxyoximes, β-hydroxy carbonyl compounds, hydroxyamines, and others are also useful.

Essentially, the cyclic polymerization process of this invention consists of contacting the conjugated diolefin with the catalyst system. The catalyst system is dissolved or suspended in a suitable nonreactive solvent and may comprise not only the principal separate ingredients, but any interaction product of the separate ingredients. This contact between the conjugated diolefin and catalyst system is maintained for the necessary length of time and at a suitable temperature range to effect the reaction. The polymerization process is effected under substantially anhydrous conditions and suitably in the presence of an inert atmosphere, so as to avoid extensive decomposition of the catalyst system or other undesirable effects. After the reaction has proceeded for the selected reaction time, the catalyst system is decomposed with a suitable decomposing agent, such as methanol, and the product of the process is recovered by suitable means, such as fractional distillation or crystallization.

A better understanding of the process of this invention may be obtained from the examples given below, which disclose the best mode presently contemplated to carry out this invention.

maintained at this temperature for the specified reaction time. At the end of this time, the autoclave was cooled, opened, methanol added to decompose the catalyst system, and the reaction product separated. The results of these reactions as well as infrared analyses of the products are given in Table I.

TABLE I

| Example Number | Catalyst System | Cat. Conc. (percent) | Al/Ni Ratio | Temp. (° C.) | Time (hours) | Conv. (percent) | Selectivity | | | |
|---|---|---|---|---|---|---|---|---|---|---|
| | | | | | | | CDT | COD | VCH | HBM |
| 1 | NiDMG-TEA | 0.6 | 5:1 | 150 | 1.5 | 30 | 25 | Trace | 75 | |
| 2 | NiDMG-TEA | 0.7 | 20:1 | 150 | 1.5 | 70 | 19 | 1 | 83 | |
| 3 | NiDMG-TEA | 1.4 | 5:1 | 150 | 1.5 | 20 | 5 | Trace | 95 | |
| 4 | NiDMG-TEA | 1.3 | 20:1 | 200 | 1.5 | 84 | 1 | 1 | Trace | 98 |
| 5 | NiDHG-TEA | 1.3 | 20:1 | 125 | 16 | 92 | 66 | 6.4 | 11 | 16 |
| 6 | NiDMG-TEA | 0.8 | 20:1 | 130 | 16 | 94 | 64 | 1 | 16 | 19 |
| 7 | NiDMG-TEA | 0.8 | 20:1 | 130 | 16 | 94 | 56 | 10 | 11 | 23 |
| 8 | NiDMG-TEA | 0.8 | 20:1 | 135 | 16 | 85 | 59 | 1 | 18 | 22 |
| 9 | NiDMG-TEA | 0.8 | 20:1 | 135 | 18 | 96 | 62 | 4 | 32 | 2 |
| 10 | NiDMG-TEA | 0.8 | 20:1 | 160 | 16 | 100 | 43 | 1 | 13 | 43 |
| 11 | NiDMG-TEA | 1.2 | 30:1 | 125 | 20 | 88 | 58 | 4.5 | 1 | |
| 12 | NiAA+TEA | 0.6 | 5:1 | 150 | 2 | 27 | 28 | Trace | 82 | |
| 13 | NiDMG-TEA | 2.5 | 6:1 | 160 | 4 | 32 | 24.3 | 1.3 | 14.3 | 58.6 |
| 14 | NiDMG-TEA | 1.1 | 6:1 | 145 | 4 | 82 | Trace | 1.8 | 65.3 | 33.1 |
| 15 | NiDMG-TEA | 3.0 | 3:1 | 145 | 2 | 83 | 42.4 | 3.2 | 23.6 | 29.8 |
| 16 | Ni-8-HQ-TEA | 1.8 | 6:1 | 140 | 3 | 94 | 28.4 | 8.9 | 13.9 | 48.7 |

*Examples 17–25*

The general procedure as given for Examples 1–16 was used in each of the following, with the exception of the catalyst systems. The results of these reactions using the various catalysts system are given in Table II.

TABLE II

| Example No. | Catalyst System | Cat. Conc. (Percent) | Al/metal Ratio | Temp. (° C.) | Time (hours) | Conv. (Percent) | Selectivity | | |
|---|---|---|---|---|---|---|---|---|---|
| | | | | | | | CDT | COD | VCH |
| 17 | Cr(AA)₂-TEA | 0.2 | 5:1 | 150 | 1.5 | 70 | 4 | Trace | 55 |
| 18 | Cr(AA)₂-TEA | 0.2 | 5:1 | 150 | 1.5 | 77 | 8 | Trace | 91 |
| 19 | VO(AA)₂-TEA | 0.1 | 5:1 | 150 | 1.5 | >1 | Trace | Trace | 70 |
| 20 | Co(AA)₂-TEA | 0.2 | 5:1 | 150 | 1.5 | >1 | >3 | Trace | 72 |
| 21 | Cu(AA)₂-TEA | 0.1 | 5:1 | 150 | 1.5 | >1 | >3 | Trace | 75 |
| 22 | Mn(AA)₂-TEA | 0.2 | 5:1 | 150 | 2 | >1 | >3 | Trace | 71 |
| 23 | TiO(AA)₂-Et₂AlCl | 0.6 | 5:1 | 70 | 2 | 74 | 64 | 3 | 13 |
| 24 | Co(AA)₃-Et₂AlCl | 1.0 | 3:1 | 115 | 2.5 | 40 | Trace | 1.2 | 19 |

*Examples 1–16*

The following general procedure was used with the various reported catalyst systems in the cyclic polymerization of 1,3-butadiene. All of the reactions were carried out in a 500 ml. Magne-dash autoclave. Prior to commencing the runs, the autoclave was purged with an inert gas, such as argon, so as to remove all traces of oxygen, moisture, and other gases or vapors. The catalyst system in benzene, which had been prepared as described below, was then charged into the autoclave under an inert atmosphere. The gas used to maintain the inert atmosphere was evacuated from the autoclave and 100 grams of 1,3-butadiene introduced into the autoclave. The autoclave and contents was then heated to the reaction temperature and

*Examples 26–29*

In each of the following examples, the catalyst system used was prepared by mixing a benzene solution of the metal chelate compound, with a solution of diethyl aluminum chloride (Et₂AlCl) in heptane and a benzene solution of triethyl aluminum (TEA). The ratio of metal in the chelate compound to the aluminum in the TEA and the ratio of metal to the aluminum in Et₂AlCl in each catalyst is indicated in Table III. The general procedure of Examples 1–16 was for the polymerization of butadiene in the presence of these catalyst systems, with the exception that these reactions were conducted in a 300 ml. stirred autoclave.

TABLE III

| Example No. | Catalyst System and Ratio of Components | Cat. Conc. (percent) | Temp. (° C.) | Time (hours) | Conv. (percent) | Selectivity | | |
|---|---|---|---|---|---|---|---|---|
| | | | | | | CDT | COD | VCH |
| 26 | Co(AA)₂-TEA-Et₂AlCl, 1:4:2 ratio. | 1.0 | 120 | 0.5 | 80 | 3 | 3 | 4 |
| 27 | Co(AA)₂-TEA-Et₂AlCl, 1:6:3 ratio. | 1.0 | 100 | 1 | 83 | 1 | 3 | 18 |
| 28 | Cr(AA)₃-TEA-Et₂AlCl, 1:3.5:5 ratio. | 1.0 | 100 | 1.0 | 86 | 82 | 0.2 | 0.02 |
| 29 | Cr(AA)₃-TEA-Et₂AlCl, 1:3.5:5 ratio. | 1.0 | 110 | 0.5 | 95 | 62 | 0.6 | 1 |

As may be seen, more than one Ziegler type of reducing agent is useful in a given catalyst system. Thus, with the metal chelate, a triorgano aluminum compound such as triethyl aluminum is beneficial in combination with an alkyl aluminum halide such as diethyl aluminum chloride.

The diolefins useful according to the invention are those produced by conventional processes. For instance, the butadiene used in the above examples was prepared in a commercial plant by the dehydrogenation of butene, followed by purification with cuprous ammonium acetate. A crystalline complex of the cuprous ammonium acetate with butadiene is formed, and the butadiene is released from the complex by the application of heat. As has been known since 1950 and earlier, from commercial butadiene plant operation in this country, this process gives butadiene of about 85% to 99% purity with little variation for a given set of conditions.

The butadiene used in the above examples was ordinary "plant" butadiene not subjected to any particular purification procedures, except in most cases the material was passed through a column of silica gel to remove excessive amounts of water and apparently a substantial proportion of the poymerization inhibitors such as paratertiary butylcatechol. The butadiene was obtained from the plant of Petroelum Chemicals Incorporated, Lake Charles, Louisiana. Analyses of butadiene, typical of the butadiene which was used in these examples are as follows:

| Component: | Proportion by wt. percent |
|---|---|
| Butadiene-1,3 | 98.36 |
| Isobutane | 0.00 |
| n-Butane | 0.00 |
| Isobutylene | 0.025 |
| Trans-butene-2 | 0.065 |
| Cis-butene-2 | 0.065 |
| Propylene | 0.58 |
| Propadiene | 0.075 |
| Butadiene-1,2 | 0.10 |
| Acetylenes (including methylacetylene, ethylacetylene, vinylacetylene, and dimethylacetylene | 0.06 |
| Carbonyl | 0.002 |
| Water | 0.02 |

Isobutane and n-butane are commonly present in small amounts. The total acetylenes commonly range from about 0.05% to 0.09% by weight in butadiene of about 98.5% purity. The acetylenic constituents of a similar butadiene sample were analyzed by gas chromatography, and the following compounds and amounts were found:

| Component: | Mole percent |
|---|---|
| Methylacetylene | 0.02 |
| Ethylacetylene | 0.04 |
| Dimethylacetylene | 0.01 |
| Vinylacetylene | 0.002 |

As can be seen, the diolefin as used in the examples contained other unsaturated hydrocarbons having 3–4 carbon atoms.

The abbreviations and product analyses values used in Table I and elsewhere have the following significances:

DMG=Dimethylglyoxime
AA=Acetylacetonate
TEA=Triethylaluminum
8-HQ=8-hydroxyquinoline (8-quinolinol)
CDT=1,5,9-Cyclododecatriene
COD=1,5-Cyclooctadiene
VCH=1-Vinyl-4-cyclohexene
HBM=Higher Boiling Materials; materials with a boiling point above that of CDT.

$$\text{Conversion [percent]} = \frac{\text{weight diolefin to products}}{\text{weight diolefin}} \times 100$$

$$\text{Selectivity [percent]} = \frac{\text{weight specific product}}{\text{weight diolefin to product}} \times 100$$

The preparation of the catalyst system may be effected by any of the means commonly used in the art to prepare catalyst systems of this general type. One such method is to mix, in an inert dry atmosphere, a solution of the nickel chelate in a nonreactive solvent, such as benzene, with a solution of the nontransition metal compound in a similar type of solvent. The chelate may be added to the reducing agent, or vice versa. The rate of mixing is controlled so as to avoid an excessive temperature increase of the reaction mixture due to the exothermic nature of the reaction. This mixture is then employed as the catalyst system. The catalyst system may be prepared in the reactor in a manner similar to that described above and the conjugated diolefin added to the reactor.

As indicated by the above examples importance is attached to the ratio of Ziegler-type reducing agent to nickel chelate compound used in the catalyst system. The preferred range of molar ratios of Ziegler-type reducing agent to nickel chelate compound is from about 15:1 to about 25:1, a broader useful range being from about 3:1 to 35:1.

Useful nonreactive solvents or suspending agents for the catalyst system are nonpolar organic liquids such as aliphatic and aromatic hydrocarbons, including pentane, hexane, mixtures of low-boiling aliphatic hydrocarbons, benzene, toluene and xylene. Also halogenated aliphatic or aromatic hydrocarbons such as chlorobenzene and the like may be employed. Other nonpolar organic solvents are well known.

Impurities reactive with the catalyst system or which may inhibit the reaction, such as oxygen, water, olefinic compounds other than the main monomer, phenols, amines, or alcohols, should be present in no more than very small amounts, if at all. Thus, the reaction mixtures should consist essentially of the catalyst system, the conjugated diolefin monomer, and solvent.

In the above examples only one specific method of effecting the cyclic polymerization has been described in detail. However, it is obvious that many modifications of this method may be made, as for instance, use may be made of a continuous process rather than a batch process and the use of impure starting materials rather than pure material, provided the impurities are essentially non-reactive to the catalyst system, or are present in small amounts.

The monomer for the process of the present invention is an aliphatic conjugated diolefin, the most common of which is 1,3-butadiene. However, numerous other open chain conjugated diolefins may be cyclically polymerized by this process. These include such compounds as 2-methyl-1,3-butadiene (isoprene); 1,3-pentadiene (piperylene); phenylolefins; 2-chloro-1,3-butadiene (chloroprene); 2,3-dichloro-1,3-butadiene; and 2,3-dimethyl-1,3-butadiene. The preferred diolefin is a 1,3-butadiene having no more than one radical (e.g. alkyl or halide) substituted for hydrogen.

The use of conjugated diolefins other than 1,3-butadiene will result in products containing a variety of substituents on the basic ring structure obtained with 1,3-butadiene. Thus, for example, when 2-methyl-1,3-butadiene is cyclized the predominate products obtained are vinyldimethylcyclohexene, dimethylcyclooctadiene, trimethylcyclododecatriene, and tetramethylcyclohexadecatetraene.

The aliphatic conjugated diolefin used as the monomer should be relatively pure, although it may comprise small amounts of impurities inherently present such as water, olefins, acetylenes, and polymerization inhibitors such as resorcinol and p-tert. butyl catechol. Normally these materials appear in amounts of between about 10 p.p.m. (part per million) and 600 p.p.m. For instance, 50–100 p.p.m. of p-tert. butyl catechol is often present in 1,3-butadiene, as a polymerization inhibitor for stabilization during storage. If desired the impurities may be removed prior to polymerization. Polymerization inhibitors may be removed or reduced in quantity, for instance below 10 p.p.m., by a variety of means, such as contacting the diolefin with pellets of potassium hydroxide. The quantity of water in the diolefin monomer may be reduced, as low as a few parts per million, by freezing or by the use of dehydrating agents, such as "Drierite" (calcium sulfate), calcium carbide, silica gel, or others.

The cycloolefin products resulting from the cyclic polymerization of an aliphatic conjugated diolefin in the presence of the herein described catalyst system may be recovered by a variety of known means. Thus, the cycloolefin products may be recovered using techniques such as fractional distillation, steam distillation and crystallization. For example, after decomposing the catalyst system, the principal cycloolefin products may be separated from inorganic constituents and higher boiling material by steam distillation, the organic material separated from the water layer, dried and fractionally distilled to obtain the pure cycloolefins. Other types of recovery processes will be obvious to those skilled in the art. Normally a polymerization inhibitor or antioxidant such as those mentioned above in connection with butadiene, is added immediately after recovery of the products.

A wide variety of chelate compounds of nickel are known and are applicable in the catalyst system of the present invention. The terminology of "chelating groups," "chelates," and "chelate compounds" is used in accordance with its standard usage in the prior art and as exemplified in Moeller, Inorganic Chemistry, pp. 237–242, John Wiley and Sons, Inc., New York (1952). As stated above, of the known chelating groups, those of preferred usage are the glyoximes, β-ketones, α-aminocarboxylic acids, α-hydroxycarboxylic acids, and 8-quinolinols. Ketoximes, α-hydroxyoximes, β-hydroxy carbonyl compounds, hydroxyamines, and other chelating groups may be used.

The nickel chelate compounds of a beta-ketone useful as a component of the catalyst system comprises those wherein the chelating group has a structure of

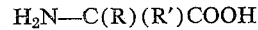

wherein R is an alkyl, cycloalkyl, aryl, or an aralkyl radical, or a substituted derivative thereof, and R' is alkyl, cycloalkyl, aryl or an aralkyl radical, or a substituted derivative thereof. When R' is a hydrocarbon radical, it may be the same as, or different than R. For example, R may be a methyl, ethyl, isopropyl, cyclohexyl, benzyl, butyl, phenyl, methylcyclohexyl or tolyl radical, and R' when a hydrocarbon may be the same as described for R or a different radical. The preferred beta-ketone is acetylacetone. Similarly the corresponding chelates of 1,3-hexanedione, 3,5-nonanedione and the like may be used.

The nickel chelate compounds of a glyoxime useful as a component of the catalyst system comprises as the chelating group the glyoximes having a structure of

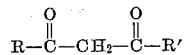

wherein R and R' may be the same or different and represent a member selected from the group consisting of hydrogen, alkyl, cycloalkyl, aryl, and aralkyl radicals and substituted derivatives thereof. Thus, R, for example may be methyl, butyl, isopropyl, cyclohexyl, benzyl, phenyl, methylcyclohexyl or tolyl radical and R' may be the same or a different radical. The preferred glyoxime is dimethylglyoxime. Other useful glyoximes include diphenylglyoxime, methylbenzylglyoxime, and cyclohexylmethylglyoxime.

The nickel chelate compounds of an 8-quinolinol (8-hydroxyquinoline) useful as a component of the catalyst system include preferably 8-quinolinol and the 5,7-dihalo-8-quinolinols, such as 5,7-dichloro-8-quinolinol and 5,7-dibromoquinolinol, as chelating groups.

The nickel chelate compounds of an α-aminocarboxylic acid useful as a component of the catalyst system comprises those chelating groups having a structure of $$H_2N-C(R)(R')COOH$$

wherein R and R' may be the same or different and represent a member selected from the group consisting of hydrogen, alkyl, cycloalkyl, aryl and aralkyl radicals and substituted derivatives thereof. Thus, R, for example, may be hydrogen, ethyl, isopropyl, pentyl, cyclohexyl, tolyl, benzyl or ethylcyclohexyl, and R' may be the same or different. The preferred α-aminocarboxylic acid is glycine (aminoacetic acid). Other particularly useful α-aminocarboxylic acids include α-aminobutyric acid, α-amino-α-phenylpropionic acid, and α-amino-α-cyclohexylacetic acid.

The nickel chelate compound of an α-hydroxy carboxylic acid useful as a component of the catalyst system include these chelating groups having a structure of $$HO-C(R)(R')COOH$$

wherein R and R' may be the same or different and represent a member selected from the group consisting of hydrogen, alykyl, cycloalkyl, aryl, and aralkyl radicals and substituted derivatives thereof. Thus, R, for example, may be hydrogen, ethyl, isopropyl, benzyl, butyl, phenyl, tolyl or methylcyclohexyl and R' may be the same or a different radical. The preferred α-hydroxycarboxylic acids are lactic acid and glycolic acid. Other particularly useful α-hydroxycarboxylic acids include α-hydroxyphenylacetic acid, α-hydroxy-α-phenylacetic acid, and α-hydroxycyclohexylacetic acid.

In addition to the above, numerous other nickel chelate compounds may be used in the catalyst system of the present invention. Thus, nickel may be chelated with other chelating groups, as for example, hydroxy amines, i.e. ethanolamines and o-aminophenol; α-hydroxyoximes, i.e. α-benzoin oximes and salicylaldoxime; and β-hydroxycarbonyl compounds, such as salicylaldehyde and o-hydroxyacetophenone.

The term non-transition metal is used here and in the appended claims as defining the nontransition metal elements of Groups IA, II, IIIA and IVA of the Periodic Table of Elements. The preferred nontransition metal elements for use in the catalyst system of the present invention are lithium, sodium, potassium, rubidium and cesium of Group IA; beryllium, magnesium, calcium, strontium, barium, zinc and cadmium of Group II; aluminum, gallium, indium, and thallium of Group IIIA; and germanium, lead and tin of Group IVA.

The nontransition metal, organometallic-component of the catalyst system comprises the compounds corresponding to the formula $R_aM$, wherein M is the nontransition metal as defined above, $a$ is an integer equal to the valence of the metal and R represents a member selected from the group consisting of alkyl, cycloalkyl, aryl, aralkyl and substituted derivatives thereof. The alkyl, aralkyl, cycloalkyl, and aryl radicals which are represented by R above include radicals having up to about 20 carbon atoms, although radicals having about 10 or less carbon atoms are preferred. Examples of suitable organometallic compounds of the nontransition metals include butyllithium, phenylsodium, allylsodium, diethylzinc, triethylaluminum tri-n-octylaluminum and the like.

Complex organometallic compounds useful as reducing agents have the empirical generic formula $R_aM_1M_2$, wherein $M_1$ is an alkali metal or alkaline earth metal such as lithium sodium, potassium, magnesium or calcium; $M_2$ is a Group IIIA metal such as aluminum; $a$ and $b$ are numbers the sum of which is equal to the sum of the valences of the metals M, and $M_2$; and R represents an organic radical as defined in the foregoing paragraph. Examples of suitable complex organometallic compounds include lithium aluminumtetradecyl, sodium aluminumtetradecyl, magnesium aluminumpentaethyl, potassium aluminumcyclohexyl, and lithium aluminumtetra(4-vinylcyclohexane).

The nontransition metal organometallic halide component of the catalyst system comprises the compounds corresponding to the formula $R_aMX_b$ wherein M is a nontransition metal, as defined above, with a valence greater than 1, $a$ and $b$ are integers and the sum of $a$ and $b$ is equal to the valence of the metal M, X represents a halogen selected from the group consisting of fluorine, chlorine, bromine, and iodine and R represents a member selected from the group consisting of alkyl, cycloalkyl, aryl and aralkyl and substituted derivatives thereof. The alkyl, cycloalkyl, aryl, and aralkyl radicals which are represented by R above include radicals having up to above 20 carbon atoms, although radicals having 10 carbon atoms or less are preferred. Examples of suitable organometallic halides of the nontransition metals include diethylaluminum chloride, ethylaluminum dichloride, octylaluminum diiodide, dicyclohexylgallium chloride, di(3-phenyl-1-methylpropyl) indium fluoride, propylmagnesium chloride, phenylmagnesium bromide and the like.

The nontransition metal hydride component of the catalyst system comprises the metal hydrides corresponding to the formula $MH_a$, wherein M is a nontransition metal, defined above, and $a$ is an integer equal to the valence of the metal. Examples of suitable metal hydrides include sodium hydride, aluminum hydride, lithium hydride, calcium hydride, gallium hydride, magnesium hydride and the like.

The nontransition metal, complex metal hydride component of the catalyst system comprises the hydrides corresponding to the formula $M_1M_2H_a$, wherein $M_1$ represents a member selected from the group consisting of lithium, sodium, potassium, rubidium, cesium, beryllium, magnesium, calcium, strontium and berium; $M_2$ represents a member selected from the group consisting of aluminum, galium, indium and thallium; and $a$ is an integer equal to the sum of the valences of the two metals. Examples of suitable complex metal hydrides include lithium aluminum hydride, lithium indium hydride, calcium aluminum hydride, cesium aluminum hydride, lithium gallium hydride, barium aluminum hydride and the like.

The nontransition metal, complex organometallic hydride component of the catalyst system comprises the hydrides corresponding to the formula $M_1M_2H_aR_b$, wherein $M_1$ represents a member selected from the group consisting of lithium, sodium, potasium, rubidium, cesium, beryllium, magnesium, calcium, strontium and barium; $M_2$ represents a member selected from the group consisting of aluminum, gallium, indium and thallium; $a$ and $b$ are numbers the sum of which is equal to the sum of the valence of the metals; and R represents a member selected from the group consisting of alkyl, cycloalkyl, aryl, aralkyl and substituted derivatives thereof. The alkyl, cycloalkyl, aryl and arylalkyl radicals which are represented by R above include radicals having up to about 20 carbon atoms, although radicals having about 10 carbon atoms or less are preferred. Examples of suitable complex organometallic hydrides include sodium aluminumtributylhydride, calcium aluminumdiethylhydride, sodium indiumethylhydride and the like.

In this specification, "integer" is used to denote a whole number of 1 or greater, and "number" has the same meaning but includes zero. Also, wherever the catalyst is specified as containing or comprising the transition metal chelate and the Ziegler-type reducing agent, it is intended to include interaction products of these compounds, if any.

In place of nickel chelates other metal chelates may be used with the type of reducing agent specified, as catalysts for the subject reaction. Thus a broader aspect of the invention is in the use of a chelate of a metal selected from the group consisting of titanium, vanadium, chromium, manganese, iron, cobalt, nickel, zirconium, molybdenum, tungsten and copper. Nickel chelates are much preferred, but significant yields of cycloolefins including vinylcyclohexene, cyclooctadiene and cyclododecatrienes have been obtained from butadiene using, as catalyst components, triethyl aluminum with each of vanadyl acetylacetonate, chromium acetylacetonate, manganese acetylacetonate, cobalt acetylacetonate, molybdenum acetylacetonate, tungsten acetylacetonate, and copper acetylacetonate. In the latter experiments, the conditions were similar to those of the above examples. Using chromium acetylacetonate, high conversions were achieved, with a very high selectivity for cyclododecatriene or vinylcyclohexene.

I claim:
1. In a process for the preparation of a cycloolefin by the cyclic polymerization of an aliphatic conjugated diolefin selected from the group consisting of 1,3-butadiene, 2-methyl-1,3-butadiene, 2-chloro-1,3-butadiene, and 1,3-pentadiene, the improvement which comprises (1) effecting said cyclic polymerization by contacting said diolefin with a catalyst derived from components consisting essentially of at least one Ziegler-type reducing agent selected from the group consisting of organo metallics, complex organometallics, organometallic halides, metal hydrides, complex metal hydrides and complex organometallic hydrides, and a nickel chelate, wherein the chelating group is a member selected from the group consisting of β-ketones, glyoximes, 8-quinolinols, α-aminocarboxylic acids, α-hydroxycarboxylic acids, α-hydroxyoximes, hydroxyamines and β-hydroxycarbonyl compounds, said reducing agent comprising a trihydrocarbyl aluminum compound, the proportion by weight of said catalyst, based on the total weight of diolefin, being between about 0.1% and about 4%, and (2) recovering the cycloolefin product so formed.

2. A process for the preparation of a cycloolefin by the cyclic polymerization of an aliphatic open chain conjugated diolefin which comprises the steps of (1) contacting a conjugated diolefin selected from the group consisting of 1,3-butadiene, 2-methyl-1,3-butadiene, 2-chloro-1,3-butadiene, 1,3-pentadiene and 2,3-dimethyl-1,3-butadiene; with a catalyst system derived from components consisting essentially of at least one Ziegler-type reducing agent selected from the group consisting of organometallics, complex organometallics, organometallic halides, metal hydrides, complex metal hydrides and complex organometallic hydrides; and a nickel chelate compound wherein the chelating group is a member selected from the group consisting of β-ketones, glyoximes, 8-quinolinols, α-aminocarboxylic acids, and α-hydroxycarboxylic acids; the ratio of Ziegler-type reducing agent to nickel chelate in the catalyst system being in the range of from about 3:1 to about 35:1, the proportion by weight of said catalyst system, based on total weight of diolefin, being between about 0.1% and about 4.0%, said contact of the conjugated diolefin and catalyst system being at a temperature and for a sufficient period of time to effect the reaction and (2) recovering the cycloolefin product so formed.

3. The process of claim 2, wherein the aliphatic conjugated diolefin is 1,3-butadiene, and the reducing agent comprises a compound of aluminum.

4. The process of claim 3, wherein said Ziegler-type reducing agent comprises a trihydrocarbyl aluminum.

5. In a process for the preparation of a cycloolefin by the cyclic polymerization of an aliphatic conjugated diolefin, the improvement which comprises (1) effecting said cyclic polymerization by contacting said diolefin with a catalyst system derived from components consisting essentially of at least one alkyl aluminum compound having two to three alkyl radicals and a nickel chelate, the proportion by weight of said catalyst system, based on the weight of said diolefin, being between about 0.1% and about 4%; and (2) recovering the cycloolefin product so formed.

6. In a process for the preparation of a cycloolefin by the cyclic polymerization of an aliphatic conjugated diolefin, the improvement which comprises (1) effecting said cyclic polymerization by contacting said diolefin with a catalyst system derived from components consisting essentially of at least one alkyl aluminum compound having two to three alkyl radicals and a titanium chelate, the proportion by weight of said catalyst system, based on the weight of said diolefin, being between about 0.1% and about 4%; and (2) recovering the cycloolefin product so formed.

7. In a process for the preparation of a cycloolefin by the cyclic polymerization of an aliphatic conjugated diolefin, the improvement which comprises (1) effecting said cyclic polymerization by contacting said diolefin with a catalyst system derived from components consisting essentially of at least one alkyl aluminum compound having two to three alkyl radicals and a chromium chelate, the proportion by weight of said catalyst system, based on the weight of said diolefin, being between about 0.1% and about 4%; and (2) recovering the cycloolefin product so formed.

8. In a process for the preparation of a cycloolefin by the cyclic polymerization of butadiene, the improvement which comprises (1) effecting said cyclic polymerization by contacting said diolefin with a catalyst system derived from components consisting essentially of at least one Ziegler-type reducing agent and a transition metal chelate compound; wherein the Ziegler-type reducing agent is a trihydrocarbyl aluminum compound or admixtures thereof with a material from the group consisting of non-transition metal organometallics, complex organometallics, organometallic halides, metal hydrides, complex metal hydrides, and complex organometallic hydrides; wherein the transition metal of the transition metal chelate is of a metal selected from the group consisting of nickel, titanium and chromium; wherein the chelating group of the transition metal chelate is a member selected from the group consisting of $\beta$-ketones, glyoximes, 8-quinolinols, $\alpha$-aminocarboxylic acids, $\alpha$-hydrocarboxylic acids, $\alpha$-hydroxyoximes, hydroxyamines, and $\beta$-hydroxy carbonyl compounds, the proportion by weight of said catalyst system based on total weight of butadiene, being between about 0.1% and about 4%; and (2) recovering the cycloolefin product so formed.

9. The process of claim 8 wherein said conjugated diolefin is impure 1,3-butadiene.

References Cited
UNITED STATES PATENTS

| | | | |
|---|---|---|---|
| 2,903,491 | 9/1959 | Reppe et al. | 260—666 |
| 2,964,575 | 12/1960 | Sekul | 260—666 |
| 3,008,943 | 11/1961 | Guyer | 260—683.15 |
| 3,231,627 | 1/1966 | Royston | 260—666 |

FOREIGN PATENTS

| | | |
|---|---|---|
| 219,580 | 2/1962 | Austria. |
| 598,363 | 6/1961 | Belgium. |
| 859,464 | 12/1952 | Germany. |
| 872,348 | 7/1961 | Great Britain. |
| 878,120 | 9/1961 | Great Britain. |

DELBERT E. GANTZ, *Primary Examiner.*

ALPHONSO D. SULLIVAN, *Examiner.*

C. E. SPRESSER, L. FORMAN, V. O'KEEFE,
*Assistant Examiners.*